US007274905B1

(12) United States Patent
Nguyen et al.

(10) Patent No.: US 7,274,905 B1
(45) Date of Patent: Sep. 25, 2007

(54) DIGITAL RADIO FEEDBACK APPARATUSES, SYSTEMS, AND METHODS

(75) Inventors: Hong Nguyen, Atlanta, GA (US); Linda Roberts, Decatur, GA (US)

(73) Assignee: AT & T BLS Intellectual Property, Inc., Wilmington, DE (US)

( * ) Notice: Subject to any disclaimer, the term of this patent is extended or adjusted under 35 U.S.C. 154(b) by 574 days.

(21) Appl. No.: 10/663,537

(22) Filed: Sep. 16, 2003

(51) Int. Cl.
*H04H 1/00* (2006.01)
*H04B 7/185* (2006.01)

(52) U.S. Cl. .................... 455/3.02; 455/12.1; 455/66.1

(58) Field of Classification Search ............... 455/3.01, 455/3.05, 3.06, 427, 12.1, 13.1, 3.02, 66.1
See application file for complete search history.

(56) References Cited

U.S. PATENT DOCUMENTS 5,572,442 A * 11/1996 Schulhof et al. ............ 709/219
6,658,062 B1 * 12/2003 Nakatsuyama .............. 375/259
6,686,880 B1 * 2/2004 Marko et al. ............... 342/457
2001/0031620 A1 * 10/2001 Ichiyoshi ................... 455/3.02
2002/0065037 A1 * 5/2002 Messina et al. ............ 455/12.1
2002/0183059 A1 * 12/2002 Noreen et al. .............. 455/427

* cited by examiner

*Primary Examiner*—Tilahun Gesesse
(74) *Attorney, Agent, or Firm*—Lee & Hayes, PLLC

(57) ABSTRACT

An apparatus, system, and method for establishing a two-way communication feedback path between a receiver and a transmitter. The receiver includes an input portion, a processor, a user interface, a control module, and a network interface. The input portion is configured to receive a signal transmitted by a transmitter and to convert the signal to an audio signal. The user interface is configured to receive an input command and to convey the input command to the processor. The processor executes a control module for processing the input command and generating a query in accordance with the input command. The network interface is configured for facilitating communication between the receiver and the transmitter via the network and the query is transmitted from the receiver to the transmitter via the network. The system includes a digital radio broadcast transmitter, a receiver in communication with the digital radio broadcast transmitter, and a network in communication with the digital radio broadcast transmitter and the receiver. The receiver is configured to establish a two-way communication path with the digital radio broadcast transmitter via the network. The method includes steps for requesting information, formulating a query, transmitting the query, and receiving a response to the query.

17 Claims, 4 Drawing Sheets

DIGITAL RADIO FEEDBACK APPARATUSES, SYSTEMS, AND METHODS

BACKGROUND

The present invention relates generally and in various embodiments to communications systems. More specifically, the present invention relates generally and in various embodiments to satellite digital audio service (SDARS) apparatuses, systems, and methods.

Although various implementations of the present invention, among many, may be described herein with reference to the specific illustrative embodiments related to particular applications, those skilled in the art will understand that the invention is not in any way intended to be limited to such embodiments and/or applications. Those having ordinary skill in the art and reference to the description of the embodiments herein will recognize additional modifications, applications, and other embodiments falling within the scope of the claimed invention and additional fields in which the present invention may be practiced.

Digital Radio (also known as Satellite Radio or Satellite Digital Audio Radio Service (SDARS)) is a subscriber-based digital radio service that is broadcast via satellites. Digital radio service provides compact-disc (CD) quality programming that may be digitally transmitted via one or more satellites and/or space stations to one or more Earth-based (terrestrial) digital radio stations, receivers, and/or repeaters. In satellite-based direct-broadcast radio services, digitally-encoded audio program material may be broadcast to terrestrial fixed or mobile digital radio receivers. Fixed receivers may include, for example, stand alone digital radio receivers or digital radio receivers connected via computer networks, including for example, the Internet. Mobile receivers may include, for example, digital radio receivers located in automobiles, aircrafts, watercrafts, and the like.

Satellite-based digital audio radio services such as SDARS, for example, may be broadcast to one or more digital radio receivers either directly from an orbiting satellite, or indirectly from one or more repeater stations. Such repeater stations may be useful where the digital radio receiver is located in a shielded location or where there is no direct line of sight between the radio and the satellite. In other digital audio radio services systems, the audio programs also may be transmitted in digital form by one or more space stations directly to fixed, mobile, and/or portable radio stations. Such systems may comprise, for example, orbiting satellites, complementary repeating terrestrial transmitters, telemetry, tracking, and control facilities.

The digital radio format of SDRAS systems may utilize, for example, various properties of software defined radio and may comprise a receiver and/or a transmitter device, where each device is capable of digitizing a received signal and then processing the digitized signal using digital signal processing techniques. The signals may be digitized (i.e., undergo analog-to-digital conversion) at the Radio Frequency (RF), Intermediate Frequency (IF), or baseband frequency stages. The modulated analog signal to be transmitted by the radio station, repeater, satellite, and/or space station initially may be generated as a digital signal using digital signal processing techniques and then converted to an analog signal for transmission. The signals may undergo digital-to-analog conversion at the baseband, IF, or RF stages. Fundamental characteristics of the digital radio may be changed using basic software programmability. Therefore, the modulation scheme, operating frequencies, bandwidths, multiple access schemes, source, and channel coding/decoding methods, frequency spreading/despreading techniques, and encryption/decryption techniques may be readily changed.

SUMMARY

In one general respect, embodiments of the present invention are directed to a receiver. The receiver includes an input portion configured to receive a first signal transmitted by a first transmitter; a processor in communication with the input portion for converting the first signal to an audio signal, the processor further comprising a control module for processing an input command; a user interface in communication with the processor, wherein the user interface is configured to receive the input command and to convey the input command to the processor; a control module executed by the processor for processing the input command and generating a query in accordance with the input command; and a network interface in communication with the processor configured for facilitating communication between the receiver and the first transmitter via a network, wherein the query is communicated from the receiver to the first transmitter via the network.

According to various embodiments, the present invention is directed to a system including a digital radio broadcast transmitter; a receiver in communication with the digital radio broadcast transmitter; and a network in communication with the digital radio broadcast transmitter and the receiver. The receiver is configured to establish a two-way communication path with the digital radio broadcast transmitter via the network.

In various embodiments, the present invention is directed to a method of establishing a feedback loop in a digital audio service system. The method includes requesting information from a digital radio broadcast station via a user interface portion of a satellite digital audio service receiver; formulating a query for the information based on an input signal from the user interface; transmitting the query from the receiver to the digital radio broadcast station via a network; and in response to the query, receiving a response to the query from the digital radio broadcast station at the receiver.

Other systems, methods, and/or computer program products according to embodiments of the present invention will be or become apparent to one with skill in the art upon examination of the following drawings and detailed description. It is intended that all such additional systems, methods, and/or computer program products be included within this description, be within the scope of the present invention, and be protected by the accompanying claims.

DESCRIPTION OF THE DRAWINGS

Embodiments of the present invention are described herein in conjunction with the following figures, wherein.

DESCRIPTION

Figure 1:
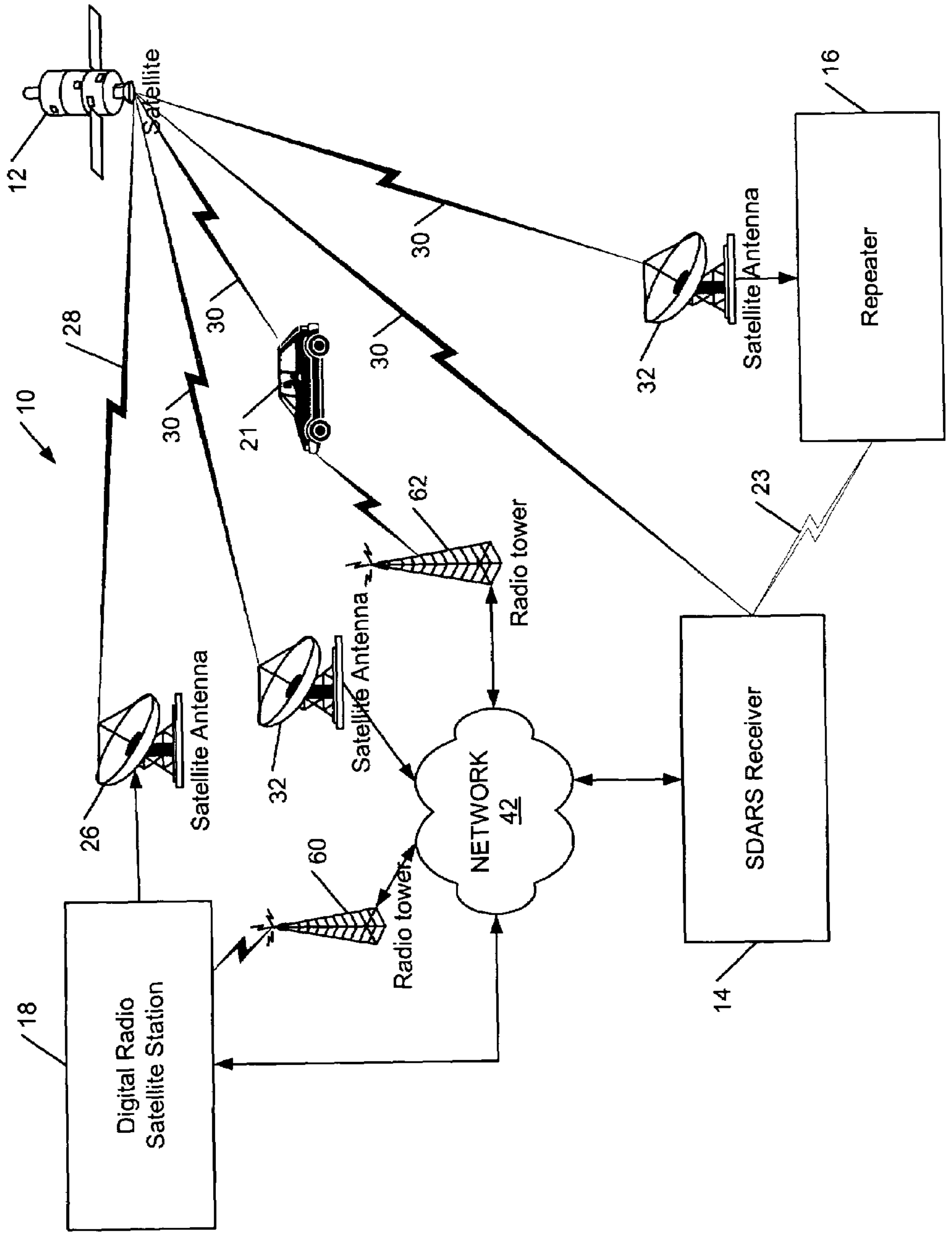
FIG. 1 illustrates one embodiment of a satellite digital audio radio service (SDARS) system architecture.

It is to be understood that the figures and descriptions of the various embodiments of present invention described herein, among others, have been simplified to illustrate representative elements of a satellite based digital radio communications system that are relevant for a clear understanding of the present invention, while eliminating, for purposes of clarity, other specific elements of the communications network. For example, digital radio station operations support systems, equipment that provides radio station facilities, miscellaneous network elements, etc., are not described herein as they do not facilitate a better understanding of the present invention. Those of ordinary skill in the art will appreciate, however, that these and other elements may be found in conventional communications networks and are readily understood.

The various embodiments of the present invention described herein, among others, are generally directed to a two-way communication satellite based radio system. In one of many embodiments of the present invention, a terrestrial radio receiver (e.g., earthbound, land based or water based radio receiver) or airborne based radio receiver or space based radio receiver may be configured with the appropriate electronic hardware and software control modules for processing signals and transmitting signals back to the originating broadcast radio station (e.g., providing a feedback path between the radio receiver and the broadcasting station). Thus, a feedback signal may be transmitted via a computer network or a satellite from the radio receiver to the broadcast radio station.

Throughout the following description of the various embodiments of the present invention, among others, the term “terrestrial based digital radio receiver” is intended to include fixed radio receivers as well as mobile radio receivers. Generally, fixed radio receivers, for example, may be characterized as radio receivers that are located in a fixed location and may form, for example, a component of a commercial or business enterprise, or may form a component of a home entertainment system. In any or all of these environments, the fixed radio receiver may be configured to interconnect with a computer network.

In contrast, a mobile radio receiver may be characterized as a radio receiver that is capable of being moved and is intended to be portable or transportable and that may be fixedly mounted to a movable object such as, for example, a laptop computer, a land based vehicle such as, for example, an automobile, a truck, a van, a motorcycle, among others. Furthermore, mobile radio receivers also may include airborne (and space based) vehicles such as, for example, airplanes, helicopters, space stations, and satellites, among others. Moreover, mobile receivers may include water based vehicles such as, for example, recreational and commercial watercrafts, freightliners, cruise ships, fishing boats, among others.

The various embodiments of the present invention also may be configured to provide two-way communications between terrestrial based radio receivers, satellites, space stations, and broadcast radio stations, among others. Embodiments of the present invention also may be configured to establish a feedback loop between terrestrial based radio receivers and broadcast radio stations via communications networks, including satellites and/or space stations. Accordingly, information may be exchanged between the radio receivers and the digital broadcasting station in a two-way communications channel rather than a one-way communication channel. In one of many possible embodiments of the present invention, information exchanged between a radio receiver and a broadcast radio station may include, for example, any information relating to a current radio broadcast program such as music, artists, news, etc., or any information pertaining to the content being broadcasted by the radio station. In various embodiments the information may require a fee while in other embodiments the information may be available for free.

Various embodiments of the present invention are described below in conjunction with the description of the various figures such that one skilled in the art may garner a better understanding of the various embodiments of the present invention, among others. Those skilled in the art will appreciate that the present invention may be employed in a variety of communications environments without departing from the scope of the invention. Furthermore, the various embodiments of the present invention may be interconnected via many different types of computer networks and telecommunications networks and is not intended to be limited to the computer networks and telecommunications networks described herein. Rather, the many embodiments of the present invention may be practiced in a variety of operating environments including, for example, computer networks and telecommunications systems comprising packet-switches, servers, and modules capable of transmitting and receiving information in the form of packets between various devices interconnected over any predetermined computer and telecommunications networks. For example, the many embodiments of the present invention may operate in various communications environments including, but not limited to, packet-switched networks, Voice over Internet Protocol (VoIP), wireless Fidelity (WiFi), Bluetooth, Ultrawideband, and other operating communications environments.

Various embodiments of the digital radio feedback system according to the present invention may be implemented in fixed radio applications. As described previously, fixed radio applications may include applications in which the radio receiver is located at one location and is not intended to be moved from that one location. In such embodiments, among others, the present invention may be employed in conjunction with a variety of computer networks such that a digital radio receiver may access a satellite, space station, and/or a digital radio broadcast station via a computer network. Computer networks may include, for example, WAN, LAN, Ethernet, Internet, and Web based, among others. In some environments the radio receiver may be in communication with a broadcasting radio station using computer networks interconnected via telephone lines such as digital subscriber lines (DSL) (e.g., if the radio is located in a residential environment), T1 lines (e.g., if the radio is located in a commercial business environment), or ISDN lines, and other digital transmission media.

In addition to fixed radio applications, the various embodiments of the present invention, among others, may be implemented in a variety of wireless communications networks and computer networks interconnected by means of wireless communications paths such as satellite communications, cellular communications, global system for mobile communication (GSM), code division multiple access (CDMA), time division multiple access (TDMA), and other wireless communications links. Also, as described previously, embodiments of the present invention, among others, may be employed in mobile applications where digital radio receivers are fixedly mounted to terrestrial moving vehicles such as land vehicles, aircraft, and watercraft as described above.

Various embodiments of the present invention, among others, will now be described with reference to the accompanying drawings. Accordingly, FIG. 1 illustrates one embodiment of a satellite digital audio service (SDARS) system 10 architecture. The system 10 may include, for example, a digital radio broadcast station 18 that transmits signals 28 containing audio content to a geostationary satellite 12 by way of satellite antenna 26. In turn, the satellite 12 transmits line-of-sight (LOS) signals 30 to one or more SDARS terrestrial radio receivers 14. The system 10 also may include one or more terrestrial repeaters 16 which receive and retransmit the satellite signals 30 as repeater signals 23 to facilitate reliable reception in geographic areas where LOS reception from the satellite 12 is obstructed by tall buildings, hills, tunnels, and other impediments to the signals 30. The SDARS receivers 14 may be designed to receive one or more signals 30 from the satellite 12 and/or from the terrestrial repeaters 16. In operation, such SDARS receivers 14 may receive both the satellite signals 30 and the repeater signals 23. The receivers 14 also may be located in mobile environments 21, which include, but are not limited to, land vehicles, aircraft, watercraft, and handheld devices, among others. The receivers 14 also may be fixed in stationary units for residential use (e.g., home entertainment, etc.) or commercial use (e.g., business, office, etc.). The digital radio broadcast station 18 also may be in communication with a network 42. Two-way communication between the SDARS receivers 14 and the digital radio broadcast station 18 may occur via the network 42.

Figure 2:
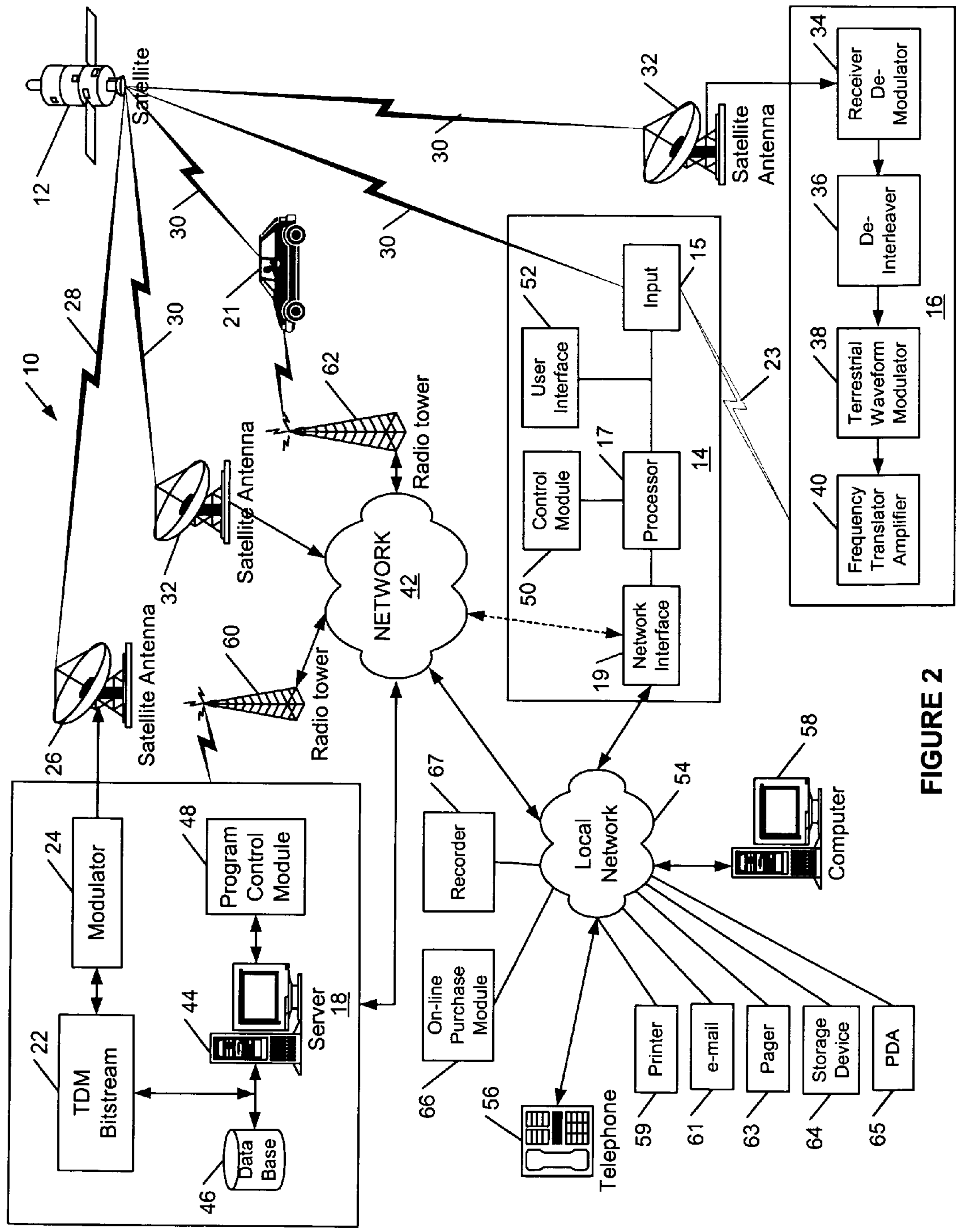
FIG. 2 is a diagram illustrating the system of FIG. 1 in greater detail.

FIG. 2 illustrates one of many embodiments of a more detailed diagram of the system 10 illustrated in FIG. 1. Although FIG. 2 will be described with reference to a single satellite 12, a single digital radio broadcast station 18, a single SDARS receiver 14, and a single terrestrial repeater 16, there exists many embodiments of the present invention that may include a plurality of each of these components. In the various embodiments of the present invention, a bit stream may be encoded as a time division multiplexed (TDM) signal using one of many coding schemes (e.g., MPEG) by a conventional encoder 22, for example. The TDM bit stream may be generated at the digital radio broadcast station 18 or may be delivered to the digital radio broadcast station via a network 42 (described in more detail below). The TDM bit stream may be upconverted to an RF signal by various modulation schemes (e.g., phase modulation) such as, for example, a quadrature phase-shift keyed (QPSK) modulator 24. The antenna 26 may uplink the upconverted signal 28 (e.g., the upconverted TDM bit stream) to the satellite 12. Those skilled in the art will appreciate that the present invention should not be limited to the specific digital radio broadcast station 18 shown herein. Rather, other systems may be used to provide uplinked signals 28 to the satellite 12 without departing from the scope of the present invention.

The satellite 12 receives the uplinked signal 28 and retransmits a downlinked signal 30 to the terrestrial repeater 16 and the SDARS receiver 14. The terrestrial repeater 16 may include, for example, an antenna 32, a receiver demodulator 34, a de-interleaver and reformatter 36, a terrestrial waveform modulator 38, and a frequency translator and amplifier 40. The receiver demodulator 34 down-converts the downlinked signal 30 to a TDM bitstream, for example. The de-interleaver and reformatter 36 re-orders the TDM bitstream for the terrestrial waveform modulator 38. The digital baseband signal is then applied to the terrestrial waveform modulator 38 (e.g., MCM or multiple carrier modulator) and then is frequency translated to a carrier frequency prior to transmission to another repeater or to the SDARS receiver 14 via repeater signal 23.

In one of many embodiments of the present invention, among others, the digital radio broadcast station 18 also may include one or more servers 44 that may include network connectivity to be connected to one or more wireline or wireless networks 42. The server 44 also may be in communication with one or more databases 46 that may contain a variety of information that may be of interest to users of digital satellite radio services. Depending on the particular embodiment of the present invention, the information contained in the database 46 may be freely available to the user as part of a basic subscription fee or may be available only upon payment of additional service fees, either as, for example, a recurring monthly or yearly amount, or on a per access basis. The server 44 also may include one or more software application programs or control modules 48 for interpreting and processing requests for the database 46 information issued by the user. In one of many embodiments of the present invention, the control module 48 may be configured to receive and process queries issued by the SDARS receiver 14 and received by the digital radio broadcast station 18 over the network 42. The SDARS receiver 14 may issue such requests via any standard communication protocol, for example. Processing may include, for example, looking up the requested information in the database 46, transmitting the information to the user via the network 42 or the satellite 12. If the information is fee based, processing may include, among other things, billing the user's account for processing the information.

The SDARS receiver 14 according to one of many embodiments of the present invention, among others, may comprise an input portion 15 configured to receive the signal 30 from the satellite 12 originating from the digital radio broadcast station 18 (e.g., a transmitter) and transmitted by the antenna 26. The SDARS receiver 14 also may include a processor 17 in communication with the input portion 15 for converting the first signal 30 to an audio signal. The processor 17 interacts with a control module 50 (described in more detail below) for processing input commands received from a user interface 52. The user interface 52 is in communication with the processor 17 and is configured to receive input commands and convey the input commands to the processor 17. The processor 17 under control of a software program or control module 50 recognizes and processes the input commands. The processor 17 also generates a query in accordance with the input command. The SDARS receiver 14 also may include a network interface 19 in communication with the processor 17. The network interface 19 may be configured to establish communication connections between the SDARS receiver 14 and the digital radio broadcast station 18 either through network 42 directly or through the local network 54 first and then to the network 42. The query generated by the processor 17 may be communicated from the SDARS receiver 14 to the digital radio broadcast station 18 via the network 42, thus establishing a feedback loop between the SDARS receiver 14 and the digital radio broadcast station 18. Once the feedback loop is established between the SDARS receiver 14 and the digital radio broadcast station 18, the two-way communications via the network 42 may be maintained between the SDARS receiver 14 and the digital radio broadcast station 18. Information therebetween may thus be exchanged bi-directionally. Furthermore, information feedback from the digital radio broadcast station 18 may be transmitted to the SDARS receiver 14 both by way of the network 42 as well as via the satellite 12. Information also may be transmitted to the digital radio broadcast station 18 wirelessly via a wireless network by way of radio tower 60.

The various embodiments of the present invention may include a SDARS receiver 14 comprising the control module 50 for processing any input commands issued by the user via the user interface 52 and for generating a query to the server 44 at the digital radio broadcast station 18, for example. The control module 50 may be configured to send queries and receive responses to and from the digital radio broadcast station 18, respectively, via, for example, any standard communication protocol supported by the underlying network infrastructure. Likewise, the control module 48 may be configured to receive and send responses to the queries sent by the user via the standard communication protocol of the underlying communications network infrastructure in which the SDARS receiver 14 and the digital radio broadcast station 18 are deployed. The standard protocols may include, for example, any number of suitable protocols, such as, for example TCP/IP, Wi-Fi, ATM, Ethernet, 802.11, among others. Embodiments of the present invention described herein, as well as others, may utilize any of these or other similar protocols, and/or any suitable underlying communications networks and/or computer network infrastructures that utilize such protocols.

An example of the control modules 48, 50 in accordance with the various embodiments of the present invention may comprise a software application (e.g., operating system, browser application, client application, server application, proxy application, on-line service provider application, and/or private network application) installed on the SDARS receiver 14 or server 44 for directing the execution of instructions. Other examples may include a computer program, code, a set of instructions, or some combination thereof, for independently or collectively instructing the SDARS receiver 14 or the server 44 to interact and operate as programmed. The control modules 48, 50 may be implemented utilizing any suitable computer language (e.g., C\C++, UNIX SHELL SCRIPT, PERL, JAVA, JAVASCRIPT, HTML/DHTML/XML, FLASH, WINDOWS NT, UNIX/LINUX, APACHE, RDBMS including ORACLE, INFORMIX, and MySQL) and/or object-oriented programming techniques. The control modules 48, 50 also may comprise a device, such as a workstation or PC, a microprocessor, a microcontroller, a network server, a Java virtual machine, an application-specific integrated circuit, a programmable logic array, and/or a fixed logic array, and is not limited to software instructions alone.

The control modules 48, 50 also may be embodied permanently or temporarily in any type of machine, component, physical or virtual equipment, storage medium, or propagated signal capable of delivering instructions to the SDARS receiver 14 and the server 44 and is not necessarily limited to being resident within the radio device. In particular, the control modules 48, 50 (e.g., software application, and/or computer program) may be stored on a storage medium (e.g., disk, device, or propagated signal), readable by a computer system, such that if the storage medium is read by the computer system, the functions described herein may be performed.

The SDARS receiver 14 may include a user interface 52 for receiving any user commands to be processed by the control module 50. The user interface 52 may comprise any type of mechanical, electrical, electromechanical, infrared, electromagnetic, optic, electro-optic, acoustic, and/or voice or speech recognition link between the user and the control module 50. The user interface 52 may comprise, for example, a specific hard switch operable by a button mounted to the SDARS receiver 14, a soft key, a soft button displayed on a telephone display or computer screen, a touch screen element, a voice recognition or speech interface, a wireless RF device, an infrared (IR) device, or any other interface device that allows the user to communicate to the control module 50 to initiate a query based on the input command to the digital radio broadcast station 18. The user interface 52 may be located on the SDARS receiver 14, a telephone 56, or a computer 58. The control module 50 also may be a software program, or other code, embedded in the SDARS receiver 14, the telephone 56, or the computer 58. The control module 50 receives the information request input commands from the user interface 52 and formulates an appropriate query message to transmit to the digital radio broadcast station 18 using an appropriate protocol based on the input command. The control module 50 then processes the query to the digital radio broadcast station 18.

The SDARS receiver 14 also may include network connectivity so that it may communicate over a local network 54 or the network 42. The local network 54 is representative of a variety of local networks including wireless networks, local area networks (LAN), and home networks, among others. The local network 54 also may be connected to the telephone 56, the personal computer 58, and the server 44, among others. The local network 54 may be interconnected with the network 42 via a variety of digital transmission links including those provided by the local telephone company such as, for example, a digital subscriber line (DSL), asymmetrical digital subscriber line (ADSL), high bit rate digital subscriber line (HDSL), single pair symmetrical services (SDSL), or an integrated services digital network (ISDN) line. If the SDARS receiver 14 is based in a commercial or business environment, the local network 54 may communicate with the network 42 via a T-1 digital transmission link. If the SDARS receiver 14 is contained in a mobile environment 21, the SDARS receiver 14 may include a wireless network 62 connection such that the SDARS receiver 14 can communicate via the wireless network 62.

The network 42 may include one or more delivery systems for directly or indirectly connecting the SDARS receiver 14 and the digital radio broadcast station 18 to each other. Furthermore, the network 42 may include one or more wireless communication links 60, 62. Examples of delivery systems include, but are not limited to, a local area network (LAN), a wide area network (WAN), the Internet, the Web, a telephony network (e.g., analog, digital, wired, wireless, PSTN, ISDN, or xDSL), a radio network, a television network, a cable network, a satellite network, and/or any other wired or wireless communications network configured to carry information such as WiFi, Bluetooth, and Ultrawideband networks, and any combinations thereof, for example. The network 42 also may include one or more other communications elements, such as, for example, intermediate nodes, proxy servers, firewalls, routers, switches, adapters, sockets, and wired or wireless data pathways, configured to direct and/or deliver data. Furthermore, the network 42 may utilize the functionality of intelligent communications networks, such as for example, the advanced intelligent network (AIN). The various embodiments of the present invention, among others, may communicate over such intelligent communications networks via a variety of signaling protocols, including, but not limited to, the SS7 protocol, TCAP, IP with LDAP, TCP/IP, and other similar protocols.

In use, the user of the SDARS receiver 14 tuned to a specific channel being transmitted by the digital radio broadcast station 18 may issue a request to the station 18 for some information contained in the database 46, for example. The user may initiate the request via the user interface 52 located on the SDARS receiver 14, the telephone 56, or the computer 58, among other devices. The control module 50 receives the input command and recognizes whether the user wants to initiate a query request to the command and formulates an appropriate query message to transmit to the digital radio broadcast station 18 using a suitable wireline or wireless protocol. The query message may include, for example, information relating to the digital radio broadcast station 18, the current channel, date, time, location of the SDARS receiver 14, an identification number associated with the SDARS receiver 14, an address that identifies the program the user is listening to, and/or where to send the information. The servers 44 at the digital radio broadcast station 18 may then look up the requested information in the database 46 and send the information back to the user by way of a response packet. The information received by the user may be displayed in a format suitable for viewing. This may include, for example, a display located on the SDARS receiver 14, a display located on the telephone 56, and/or a screen on the computer 58.

Figure 3:
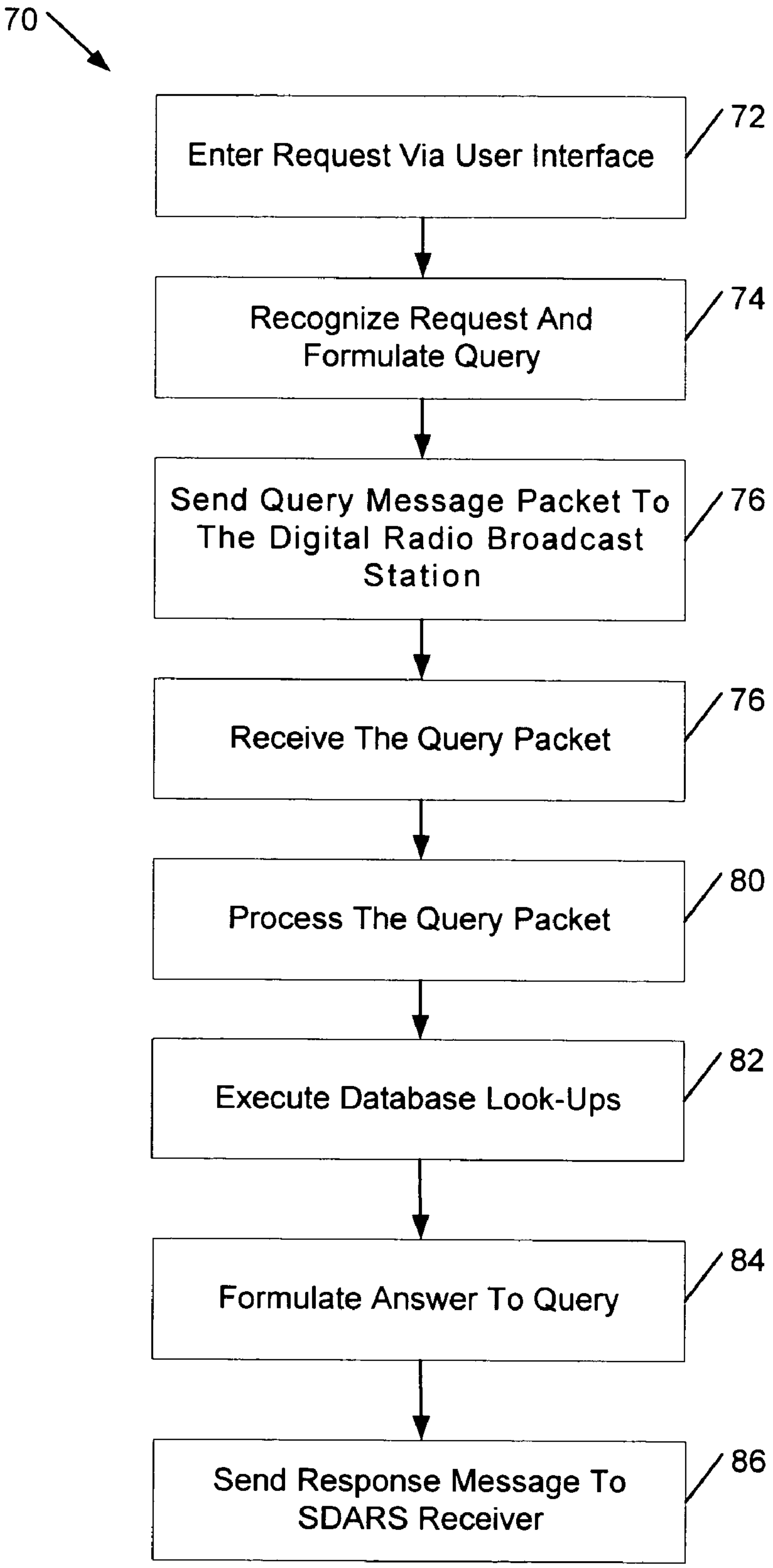
FIG. 3 is a process flow according to one embodiment of the present invention.

FIG. 3 is a process flow diagram 70 of a digital radio feedback system according to one of may embodiments of the present invention. At block 72 a user enters a request via the user interface 52 located on the SDARS receiver 14, telephone 56, computer 58, or any other device in communication with the SDARS receiver 14 such as, for example, a personal digital assistant (PDA), portable computer, mobile phone, and other devices. At block 74, the control module 50 recognizes the request and formulates a query message for the server 44.

At block 76 the communication program control module 50 sends the message packet 90 containing the query to the digital radio broadcast station 18 via the network 42. The packet 90 may be sent, for example, via a standard communication protocol through the local network 54, through the network 42, or via the wireless interface 60 to the network 42. Depending upon the specific implementation in the various embodiments of the present invention the protocol may depend upon the underlying network infrastructure that the SDARS receiver 14 is using. Examples of such protocols comprise TCP/IP, Wi-Fi, ATM, Ethernet, 802.11, and other communication protocols.

At block 78, the server 44 in communication with the digital radio broadcast station 18 receives the information message packet 90. At block 80 the server processes the message packet 90 and interprets the query. The server 44 then passes the query to the underlying control module 48, which further processes the query. In various embodiments of the present invention, the SDARS receiver 14 identification address 106 may be checked to ensure correct billing, level of participation of the user, and may be retained in the database 46 for future marketing initiatives, for example. At block 82, the control module 48 at the digital radio broadcast station 18 executes various database lookups to fulfill the request. At block 84, the control module 48 formulates a response to the query by combining and synchronizing the various lookup results. At block 86, the control module 48 instructs the server 44 to send the response message to the SDARS receiver 14 that initiated the query.

Thus, a two-way communication path is established between the SDARS receiver 14 and the digital radio broadcast station 18. The response message also may be implemented in the form of a packet, or a series of packets, containing at least the necessary radio identification information, such as, for example the SDARS receiver 14 identification address 106, so that the packet 90, or series of packets, may be interpreted only by the SDARS receiver 14 that initially launched the query. The packet 90 or packets comprising the response message may be transmitted back to the user via the network 42, the local network 54, or the satellite 12 using any suitable protocols. Once the SDARS receiver 14 receives the response message, the SDARS receiver's 14 control module 50 presents the information contained in the body of the message to the user via the user interface 52. Those skilled in the art will appreciate that the user may view the information contained in the body of the response message via, for example, a display device located on the telephone 56, the user interface 52 or the computer 58.

Figure 4:
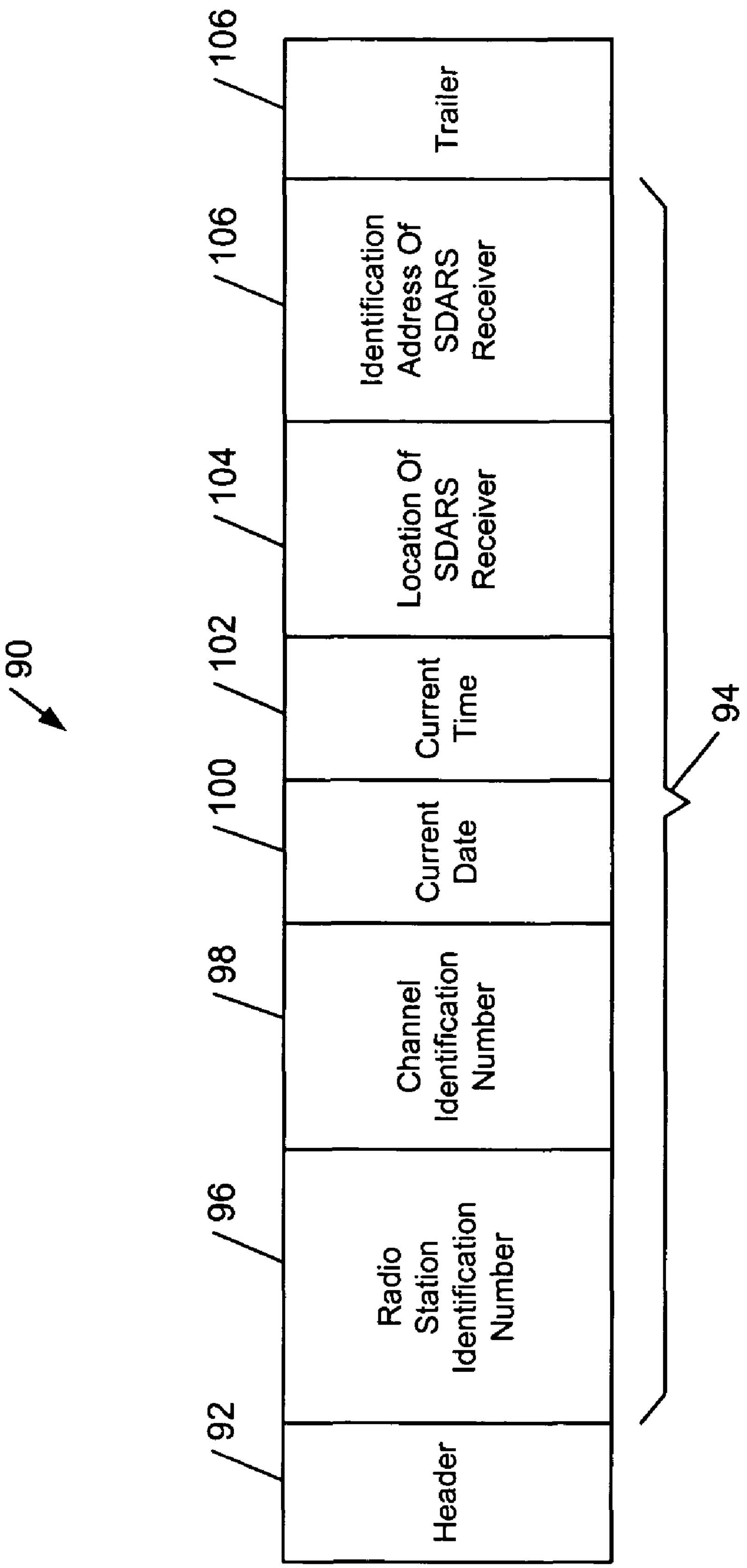
FIG. 4 is a diagram of a schematic of an information message packet according to one embodiment of the present invention.

With reference now to FIG. 4, the query message may be implemented in the form of one or more packets 90 comprising, for example, a header 92, a payload 94, and a trailer 108. The information contained in the header 92 and the trailer 108 may vary depending upon the implementation of the embodiments of the present invention. The payload 94 portion of the packet 90 may include, for example, the radio station identification number 96 (e.g., the radio station that the user is presently listening to), the channel identification number 98 if there is more than one channel per radio station, the current date 100, the current time 102, the location 104 of the SDARS receiver 14 if there is a different program broadcast in a different city, and the identification address 106 of the SDARS receiver 14. The identification address 102 may be, for example, a telephone number, an Internet protocol (IP) address, or any other addressing scheme that may be employed such that the reply to the request by the digital radio broadcast station 18 can find its way back to the SDARS receiver 14.

Table 1 below illustrates one example of an XML (Extensible Markup Language) file to structure, store, and send information such as a query message from the SDARS receiver 14 to the digital radio broadcast station 18. Line 1 is an XML file declaration that defines the XML version and the type of character encoding used in the query message. In this example, the message conforms to the 1.0 specification of XML and uses the UTF-8 (Universal Character Set Transformation Format 8), which is an ASCII compatible multi-byte character encoding format used by object oriented programming languages. Line 2 is a comment line describing that the query message is an XML file being sent by a radio client residing in the SDARS receiver 14 to the digital radio broadcast station 18.

Line 3 describes the root element of the XML file "dradio: message." The root element includes a start tag "dradio: message" and an end tag "/dradio:message" at line 29. The root element "dradio:message" also includes the content between the start tag and the end tag include child element "SongRequest" at line 10 and all of its associated child elements "stationID" at line 11, "Date" at line 12, "Time" at line 13, and "Location" at line 17. The "dradio:message" element uses its attributes to identify any external namespaces that are to be used by the "dradio:message" element and all of its child elements. These external namespaces and attributes are identified in lines 3-5. The namespaces are strings that may be used to differentiate between the namespaces. In this example the namespaces are defined as Internet addresses: http://www.companyA-.com/dradio, http://www.w3.org/2001/XMLSchema-instance," and http://www.companyA.com/dradio/schema-v.1.xsd for example. Lines 6-8 define attributes that provide additional information about the "dradio:message" element.

Line 6 defines the "system" attribute as a string that is used to pass the model number of the SDARS receiver 14 to the digital radio broadcast station 18. Line 7 defines the "messadgeID" attribute as a string that is used to correlate the query message with the response. Line 8 defines the "priority" to be given to the query message.

The opening tag for the child element "SongRequest" is on line 10 and its closing tag is on line 28. The child elements of the "SongRequest" contained therebetween describe the data to be sent to the digital radio broadcast station 18 by the SDARS receiver 14. This data may include, for example, the station identification "stationID" element at line 11 describing the radio station as FM90.1. This may be, for example, the radio station that the SDARS receiver 14 is tuned to at the time the query message is sent. In addition, the child elements may include, for example, the "Date" element 08122003 (Aug. 12, 2003) at line 12 as well as the current time "Time" at line 13. The "Time" is expressed in Greenwich Mean Time (GMT) by "hour" at line 14 and "minute" 5 at line 15. The location of the SDARS receiver 14 may be described in terms of its longitude and latitude, for example. The data elements "degrees" and "minutes" at lines 19 and 20, respectively, define the child element "Longitude" at line 18. Similarly, the data elements "degrees" and "minutes" at lines 23 and 24, respectively, define the child element "Latitude" between at line 22. In this example, the longitude 84 degrees, 26 minutes and latitude 33 degrees, 39 minutes defines the location of the city of Atlanta, Ga. The query message also may include, for example, the address of the requesting device described by element "Address" at line 27 as "20.30.40.50," for example.

TABLE 1

```
1  <?xml version="1.0" encoding="UTF-8" ?>
2  <!xml message from radio client to radio station server. Time needs
   to be GMT time-->
3  <dradio:message xmlns:dradio="http://www.companyA.com/dradio"
4    xmlns:xsi="http://www.w3.org/2001/XMLSchema-instance"
5    xsi:schemaLocation="http://www.companyA.com/dradio/schema-
     v.1.xsd"
6    System="string"
7    MessageID="string"
8    Priority="2"
9  >
10 <SongRequest>
11   <stationID>FM90.1</stationID>
12   <Date>08122003</Date>
13   <Time>
14     <hour>15</hour>
15     <minute>05</minute>
16   </Time>
17   <Location>
18     <Longitude>
19       <degrees>84</degrees>
20       <minutes>26</minutes>
21     </Longitude>
22     <Latitude>
23       <degrees>33</degrees>
24       <minutes>39</minutes>
25     </Latitude>
26   </Location>
27   <Address>20.30.40.50</Address>
28 </SongRequest>
29 </dradio:message>
```

To enhance the user's experience with digital satellite radio, the various embodiments of the present invention provide a digital radio architecture that includes two-way communication capability for accessing new applications and/or services incorporated into fixed (e.g., home and/or office networking, among others) or mobile environments. Such applications and services may be accessed and requested by means of a variety of user interfaces 52, such as specific hard buttons (e.g., as part of the digital radio, computer, or telephone), by display/soft key interfaces, by screen access, or by speech applications, among others.

In one of many embodiments of the present invention, among others, a possible application for the two-way communications digital radio feedback system 10 described above comprises the ability to solicit specific information about the type of music a user is currently listening to. This allows the user to particularly tailor the type of information he or she wishes to receive in accordance with the user's particular taste in music. This service may appeal to users who enjoy classical music, for example. A user that likes listening to classical music, for example, may not find information about the song title or artist particularly useful. Such users may find other information about the current program more interesting or useful. For example, during a classical music broadcast a classical music listener may wish to know information about a classical musical number such as the name, the composer, the year the piece was written, the orchestra performing the number, and the name of the conductor, among other information. These services may require an administrative step in which the user indicates the type of information they would like to receive for a selected radio channel of interest. This process may be repeated for all radio channels of interest to the user. In the various embodiments of the present invention, among others, this information may be displayed by the SDARS receiver 14, the computer 58, or the telephone 56. In addition, this information may be presented to the user via the user's e-mail address.

In other embodiments of the present invention, among others, a possible application for the two-way communications digital radio feedback system 10 described above comprises the ability to solicit information about music or programs previously broadcast. For example, a listener may hear only the tail end of a program or a piece of music. If the listener fails to look at the display to see what is playing, he or she may miss information about the music or the program previously broadcasted. Accordingly, the user may then launch a custom tailored query to retrieve the appropriate information concerning the previously played program.

In still other embodiments of the present invention, among others, a possible application for the two-way communications digital radio feedback system 10 described above comprises the ability to save any of the information relating to what is currently being played over a radio channel of interest in a more permanent form. For example, a user listening to a piece of music may want additional information about the music so that the user can purchase the music at a local music store, over the Internet, or mail order catalog music vendor. In this situation, the user may want a more permanent record of the information. Accordingly, with reference back to FIG. 2, the information may be printed on a printer 59, sent to an e-mail address 61, sent to a pager address 63, saved in a storage device 64 to be accessed later, or sent to a personal digital assistant 65 (PDA). In other embodiments of the present invention, the SDARS receiver 14, computer 58, telephone 56, or other device in communication with the digital radio broadcast station 18, may include a program directory that the user may browse to obtain information about a previously played program. The user also may obtain the program directory information from the database 48 (see FIG. 2) by formulating a query and then receiving the information over the network 42 (see FIG. 2).

In yet other embodiments of the present invention, among others, a possible application for the two-way communications digital radio feedback system 10 described above comprises the ability to allow a user to purchase the music they are currently listening to by means of on-line purchase module 66. Through the user interface 52 (see FIG. 2) the user may request to purchase the current piece of music. The online purchase module 66 then processes the request. For example, the request for purchase may be automatically forwarded to a user's account at an online vendor of choice, such as, for example, Amazon.com. The user's credit card information may be transmitted along with the request to purchase the music.

In further embodiments of the present invention, among others, a possible application for the two-way communications digital radio feedback system 10 described above may further comprise a recorder 67 giving the user the ability to record the music program that the user is currently listening to. Once recorded, the user has the ability to retrieve the stored music program and listen to it at a later time. Accordingly, the user interface may be tailored to allow the user to select the recorded music for listening at a later time, such as during the commute to and from work.

Although the various devices such as the telephone 56, computer 58, printer 59, e-mail address 61, pager 63, storage device 64, PDA 65, online purchase module 66, and/or the recorder are shown in FIG. 2 as being interconnected with the SDARS receiver 14 and the digital radio broadcast station 18 via the local network 54, such devices may be distributed throughout the system 10 in any combination. Those skilled in the art will appreciate and understand how to interconnect the devices throughout the system 10.

In the various embodiments of the present invention, among others, a possible application for the two-way communications digital radio feedback system 10 described above comprises the ability to access a program guide related to specific radio channels of interest to the user for specific times of interest. The program guide may then be sent to the user's e-mail address 61, pager 63, PDA 65, telephone 56, and other similar devices in communication with the digital radio broadcast station 18 via the network 42 or the satellite 12 (see FIG. 2).

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

The invention claimed is:

1. A receiver, comprising an input portion configured to receive a first signal transmitted by a first transmitter;

a processor in communication with the input portion for converting the first signal to an audio signal, the processor further comprising a control module for processing an input command;

a user interface in communication with the processor, wherein the user interface is configured to receive the input command and to convey the input command to the processor;

a control module executed by the processor for processing the input command and generating a query in accordance with the input command; and a network interface in communication with the processor configured for facilitating communication from the receiver and to the first transmitter via a network and communication from the first transmitter and to the receiver via the network, wherein the query is communicated from the receiver to the first transmitter via the network and wherein the receiver is configured to receive a response message from the first transmitter, the response message generated in response to the query wherein the processor generates a packet according to the input command and transmits the packet to the first transmitter via the network, and wherein the packet comprises an identification address of the receiver.

2. The receiver of claim 1, wherein the first transmitter is a digital radio broadcast station.

3. The receiver of claim 1, wherein the input portion is configured to receive a second signal from a second transmitter.

4. The receiver of claim 3, wherein the second transmitter is a satellite.

5. The receiver of claim 1, wherein the input portion is configured to receive a third signal from a third transmitter.

6. The receiver of claim 5, wherein the third transmitter is a repeater.

7. The receiver of claim 1, wherein the processor is configured for establishing a two-way communication path between the receiver and the first transmitter.

8. A system, comprising:

a digital radio broadcast transmitter;

a server and a database in communication with the digital radio broadcast transmitter, wherein the database includes information related to a digital radio broadcast; and a receiver in communication with the digital radio broadcast transmitter and configured to receive an input command comprising a request for information from the database;

wherein the receiver is configured to establish a two-way communication path with the digital radio broadcast transmitter via a network and wherein the receiver is further configured to receive a response message from the digital radio broadcast transmitter, the response message generated responsive to the request for information wherein the processor generates a packet according to the input command and transmits the packet to the first transmitter via the network, and wherein the packet comprises an identification address of the receiver.

9. The system according to claim 8, wherein the receiver further comprises:

an input portion configured to receive a first signal transmitted by the digital radio broadcast transmitter;

a processor in communication with the input portion for converting the first signal to an audio signal, the processor further comprising a control module for processing the input command;

a user interface in communication with the processor, wherein the user interface is configured to receive the input command and to convey the input command to the processor;

a control module executed by the processor for processing the input command and generating the request for information in accordance with the input command; and a network interface in communication with the processor configured for facilitating communication between the receiver and the digital radio broadcast transmitter via the network, wherein the request for information is communicated from the receiver to the digital radio broadcast transmitter via the network.

10. The system of claim 9, wherein the input portion of the receiver is configured to receive a second signal from a second transmitter, and wherein the second transmitter is a satellite.

11. The system of claim 9, wherein the input portion of the receiver is configured to receive a third signal from a third transmitter, and wherein the third transmitter is a repeater.

12. The system of claim 9, wherein the processor is configured for establishing a two-way communication path between the receiver and the digital radio broadcast transmitter.

13. The system of claim 9, wherein the processor generates a packet according to the input command and transmits the packet to the first transmitter via the network.

14. The system of claim 8, wherein the network comprises a packet switched network.

15. The system of claim 14, wherein the network comprises the Internet.

16. A method of establishing a feedback loop in a digital audio service system, the method comprising:

requesting information from a digital radio broadcast station via a user interface portion of a satellite digital audio service receiver;

formulating a query for the information based on an input signal from the user interface;

transmitting the query from the receiver to the digital radio broadcast station is via a network; and in response to the query, receiving a response to the query from the digital radio broadcast station at the receiver wherein the processor generates a packet according to the input command and transmits the packet to the first transmitter via the network, and wherein the packet comprises an identification address of the receiver.

17. The method of claim 16, further comprising executing a database look up at the digital radio broadcast station based on the contents of the query and retrieving the requested information form the database.

* * * * *